(12) United States Patent
Okamoto et al.

(10) Patent No.: US 7,492,676 B2
(45) Date of Patent: Feb. 17, 2009

(54) OPTICAL PICKUP AND OPTICAL DISC APPARATUS INCLUDING THE SAME

(75) Inventors: Yoshiki Okamoto, Kanagawa (JP); Katsuhiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/859,165

(22) Filed: Sep. 21, 2007

(65) Prior Publication Data

US 2008/0089205 A1    Apr. 17, 2008

(30) Foreign Application Priority Data

Oct. 17, 2006    (JP)    ............................. 2006-282977

(51) Int. Cl.
*G11B 7/00*    (2006.01)
(52) U.S. Cl. ................................ 369/44.24; 369/112.11
(58) Field of Classification Search ........................ None
See application file for complete search history.

(56) References Cited

U.S. PATENT DOCUMENTS

| | | | | |
|---|---|---|---|---|
| 5,107,477 | A | * | 4/1992 | Fujita et al. ............... 369/44.24 |
| 5,590,110 | A | * | 12/1996 | Sato ....................... 369/112.03 |
| 5,610,895 | A | * | 3/1997 | Izumi et al. ............... 369/44.24 |
| 6,141,302 | A | * | 10/2000 | Koyama et al. ........... 369/44.24 |
| 6,614,742 | B2 | * | 9/2003 | Ueyanagi .................... 369/118 |
| 6,643,247 | B2 | * | 11/2003 | Higashino ................. 369/112.1 |

FOREIGN PATENT DOCUMENTS

JP    2005-63595    3/2005

OTHER PUBLICATIONS

U.S. Appl. No. 11/859,165, filed Sep. 21, 2007, Okamoto, et al.
U.S. Appl. No. 11/874,464, filed Oct. 18, 2007, Okamoto.

* cited by examiner

*Primary Examiner*—Peter Vincent Agustin
(74) *Attorney, Agent, or Firm*—Oblon, Spivak, McClelland, Maier & Neustadt, P.C.

(57) ABSTRACT

An optical pickup for recording/reproducing information on/from an optical disc having recording layers, includes a light source; an objective lens for condensing an optical beam emitted from the light source on the recording layer; a photodetector having a light-receiving section for receiving return light from the optical disc; an optical-path separating unit for separating the optical path of the return light reflected by the optical disc from the optical path of the optical beam emitted from the light source; and a masking member having a masking unit shielding part of a passing-through optical beam, in which the masking unit shields the central region of the optical beam to be incident in the light-receiving section among the optical beams reflected by the other recording layers or surfaces different from the recording layer recording/reproducing information so as not to admit the central region to the light-receiving section.

4 Claims, 9 Drawing Sheets

OPTICAL PICKUP AND OPTICAL DISC APPARATUS INCLUDING THE SAME

CROSS REFERENCES TO RELATED APPLICATIONS

The present invention contains subject matter related to Japanese Patent Application JP 2006-282977 filed in the Japanese Patent Office on Oct. 17, 2006, the entire contents of which are incorporated herein by reference.

BACKGROUND OF THE INVENTION

1. Field of the Invention

The present invention relates to an optical pickup for recording information signals on an optical disc and reproducing information signals from a recorded optical disc, and an optical disc apparatus including the optical pickup.

2. Description of the Related Art

As a recording medium of information signals, optical discs, such as CDs (compact discs) and DVDs (digital versatile discs), have been used, and there has been an optical disc apparatus for recording information signals on such an optical disc and reproducing information signals from a recorded optical disc. The optical disc apparatus is provided with an optical pickup that is moved in the radial direction of the optical disc to emit an optical beam on the optical disc.

The optical pickup generally includes a light source, a beam splitter, an objective lens, and a photo-receiver. An optical beam emitted from the light source passes through the beam splitter and is condensed by the objective lens to form an optical-beam spot on a recording layer of the optical disc. The optical beam condensed on the recording layer of the optical disc is also reflected to again enter the beam splitter so that its optical path is changed by the beam splitter, thereby entering the photo-receiver.

The optical disc includes a monolayer type having a single recording layer and a multi-layer type having a plurality of recording layers. In the multi-layer optical disc, when an optical beam is condensed on one recording layer, for example, the beam is reflected by other recording layers adjacent to the one recording layer.

In the monolayer optical disc, when an optical beam is condensed on the recording layer, the optical beam is also reflected by the surface of the optical disc (the other recording layers or surfaces are also referred to "other recording layers below".

In such a manner, not only the optical beam reflected by the recording layer, on which the optical beam is condensed for recording/reproducing, but also the optical beam reflected by the other recording layers may be incident to the photo-receiver as stray light.

Such stray light may cause the quality deterioration of RF (radio frequency) signals and defects such as servo signal offset, as well as may cause the interference between the optical beams reflected the respective layers. Also, especially when an optical beam is divided with a diffraction element for producing a tracking-error signal, the interference between the principal light flux and the secondary light flux may pose a large problem due to a light density ratio.

In general, when an optical beam emitted from the light source is divided into 0-order light and ±1st-order diffracted light by a diffraction element, while the optical power of the 0-order light is increased as the principal light flux for detecting the RF signal, the ±1st-order diffracted light is about 10% of the 0-order light in the optical power in order to prevent the extinction of the recorded information on the recording layer due to the ±1st-order diffracted light as the secondary light flux.

If the 0-order light reflected by the other recording layers to be received on the photo-receiver herein is about 10% in the optical power per unit area of the 0-order light reflected by the recording layer where the optical beam is condensed for recording/reproducing information signals (also referred to as a "focus recording layer" below) to be received on the photo-receiver, for example, the ±1st-order diffracted light reflected by the focus recording layer to be received on the photo-receiver is to be roughly identical to the 0-order light reflected by the other recording layers to be received on the photo-receiver in the optical power, so that a great problem arises when a tracking error signal, spherical aberration, a land groove, and a crosstalk are detected using the ±1st-order diffracted light.

When information signals are recorded/reproduced on/from the optical disc having a plurality of recording layers in such a manner, the return light from the other layers adjacent to the focus recording layer exists in the photo-receiver other than return light from the focus recording layer for recording/reproducing, so as to interfere with each other. By the interference, a noise element may be unfavorably generated in the signal detected by a light detector.

In order to solve this problem, an optical pickup has been devised in that masking means having a masking member is arranged in the way back of an optical system for avoiding the interference by preventing the return light of the other recording layers from entering the photo-receiver (see Japanese Unexamined Patent Application Publication No. 2005-63595). However, the loss in the optical power is unfavorably increased.

SUMMARY OF THE INVENTION

According to an embodiment of the present invention, it is desirable to provide an optical pickup and an optical disc apparatus capable of preventing the generation of a noise component as well as capable of reducing the optical power loss, by reducing the incidence of stray light interfering with return light from a recording layer for recording/reproducing of an optical disc to a photo-receiver.

In an optical pickup for recording and/or reproducing information on/from an optical disc having one or a plurality of recording layers arranged in an incident direction of an optical beam, the optical pickup according to the embodiment of the present invention includes a light source emitting an optical beam with a predetermined wavelength; an objective lens for condensing an optical beam emitted from the light source on the recording layer of the optical disc; a photo-detector having a light-receiving section for receiving return light from the optical disc; an optical-path separating unit arranged between the light source and the objective lens for separating the optical path of the return light reflected by the optical disc from the optical path of the optical beam emitted from the light source; and a masking member arranged between the optical-path separating unit and the light-receiving section to have a masking unit shielding part of a passing-through optical beam or a diffracting unit diffracting part of a passing-through optical beam, in which the masking unit or the diffracting unit of the masking member shields or diffracts the central region of the optical beam to be incident in the light-receiving section among the optical beams reflected by the other recording layers or surfaces different from the recording layer recording or reproducing information so as not to admit the central region to the light-receiving section, and in which the spot-size ratio of the optical beam reflected by the recording layer recording or reproducing information on the plane where the light receiving section is formed to the optical beams reflected by the other recording layers or surfaces on the plane where the light receiving section is formed is larger than the size ratio of the masking unit or the diffracting unit to the optical beam incident to the masking member.

An optical disc apparatus according to the embodiment of the present invention includes an optical pickup for recording and/or reproducing information on/from an optical disc having one or a plurality of recording layers arranged in an incident direction of an optical beam and a rotational drive unit for rotating the optical disc, in which the optical pickup is configured as described above.

According to the embodiment of the present invention, because of the masking member having the masking unit or the diffracting unit shielding the central region of the optical beam to be incident in the light-receiving section among the optical beams reflected by the other recording layers or surfaces different from the recording layer recording or reproducing information so as not to admit the central region to the light-receiving section, the noise component is prevented from generating in a state that the optical power loss is reduced as small as possible by efficiently reducing the incident of stray light generating interference.

BRIEF DESCRIPTION OF THE DRAWINGS

FIGS. 10A and 10B are further enlarged conceptual views showing the state of optical beams incident in the light-receiving section shown in FIG. 9, wherein FIG. 10A is a side view of the light-receiving section and FIG. 10B is a plan view of the light-receiving section;

FIGS. 12A and 12B are further enlarged conceptual views showing the state of optical beams incident in the light-receiving section shown in FIG. 11, wherein FIG. 12A is a side view of the light-receiving section and FIG. 12B is a plan view of the light-receiving section;

DESCRIPTION OF THE PREFERRED EMBODIMENTS

An optical disc apparatus including an optical pickup according to an embodiment of the present invention will be described below with reference to the drawings.

Figure 1:
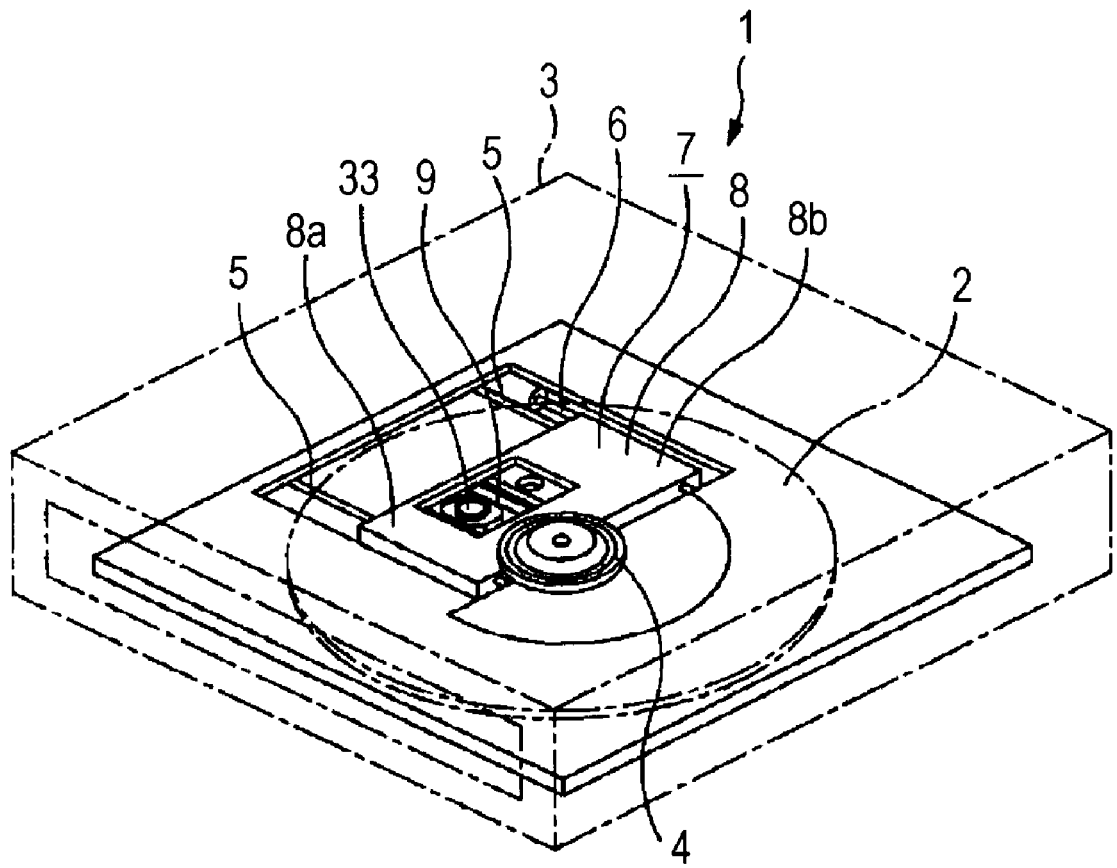
FIG. 1 is a schematic perspective view of an optical disc apparatus according to an embodiment of the present invention.

An optical disc apparatus 1 according to the embodiment of the present invention, as shown in FIG. 1, is a recording/reproducing apparatus for recording and/or reproducing information signals on/from an optical disc 2.

The optical disc 2 for recording and/or reproducing in the optical disc apparatus 1 may include a CD (compact disc), a DVD (digital versatile disc), a CD-R (recordable) additionally recordable information, a CD-RW (rewritable) writable information, a DVD-RW (rewritable), a DVD+RW (rewritable), and further an optical disc and a photo-magnetic disc employing semiconductor laser with a short emission wavelength of about 405 nm (blue-violet) for recording with high density.

Figure 2:
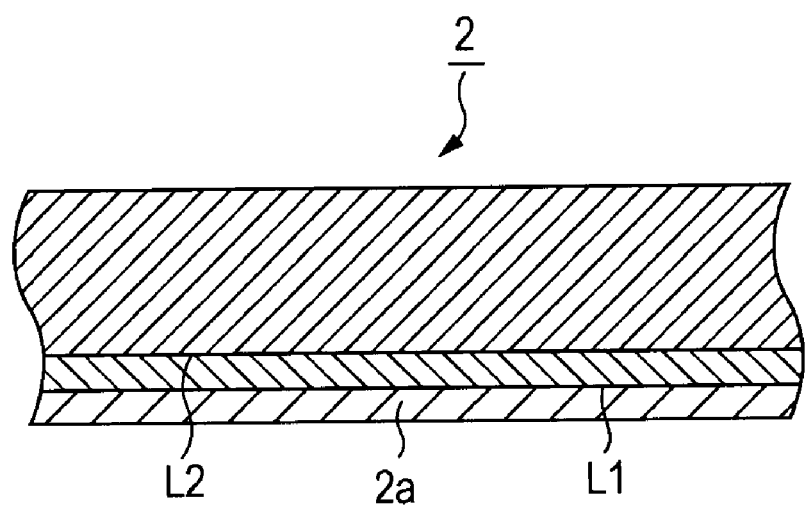
FIG. 2 is a schematic sectional view of an optical disc included in the optical disc apparatus and an optical pickup according to the embodiment.

As an optical disc included in the optical disc apparatus 1, as shown in FIG. 2, the multi-layered optical disc 2 having two recording layers will be exemplified herein below. However, an optical disc for recording/reproducing with the optical disc apparatus 1 and the optical pickup is not limited to this, so that the optical disc may be as long as it has one or a plurality of recording layers deposited in the incident direction of an optical beam. Specifically, the optical disc 2 includes a cover layer 2a, a recording layer L1, and a recording layer L2 formed in that order from the incident side of the optical beam. The thickness of the cover layer 2a herein is 75 μm and the interval between the recording layer L1 and the recording layer L2 is 25 μm.

The optical disc apparatus 1 as shown in FIG. 1 includes an outer casing 3 having required components and mechanisms arranged therein, and a disc loading slot (not shown) is formed in the outer casing 3.

Within the outer casing 3, a chassis (not shown) is arranged, and a disc table 4 is fixed to the motor shaft of a spindle motor attached to the chassis.

In the chassis, parallel guide shafts 5 are mounted and a lead screw 6 rotated by a feed motor (not shown) is supported.

An optical pickup 7, as shown in FIG. 1, includes a moving base 8, required optical components provided on the moving base 8, and an objective-lens drive unit 9 arranged on the moving base 8. Bearings 8a and 8b arranged on both sides of the moving base 8 are slidably supported by the guide shafts 5, respectively.

When a nut (not shown) provided in the moving base 8 is mated with the lead screw 6 and the lead screw 6 is rotated by the feed motor, the nut is moved in a direction corresponding to the rotational direction of the lead screw 6 so that the optical pickup 7 is shifted in the radial direction of the optical disc 2 to be mounted on the disc table 4.

In the optical disc apparatus 1 configured in such a manner, the optical disc 2 is rotated by the spindle motor; the lead screw 6 is driven corresponding to a control signal from a servo-circuit; and the optical pickup 1 is shifted to a position corresponding to a desired recording track of the optical disc 11, so as to record/reproduce information on/from the optical disc 11.

Then, the optical pickup 7 according to the embodiment of the present invention will be described. The optical pickup 7 records and/or reproduces information on/from the optical disc 2 having one or a plurality of recording layers deposited in the incident direction of an optical beam.

Figure 3:
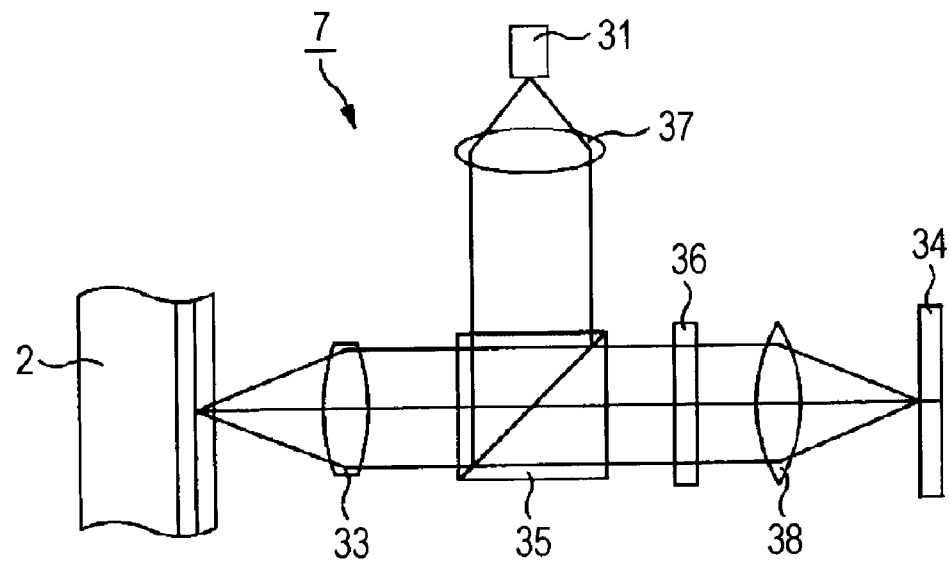
FIG. 3 is an optical path diagram for illustrating the optical system of the optical pickup according to the embodiment.

The optical pickup 7 according to the embodiment of the present invention, as shown in FIG. 3, includes a light source 31 emitting an optical beam with a predetermined wavelength, an objective lens 33 for condensing the optical beam emitted from the light source 31 on the recording layer of the optical disc 2 as a signal recording surface, a photo-detector 34 having a light receiving section 34a for receiving the return light reflected by the recording layer of the optical disc 2, a beam splitter 35 arranged between the light source 31 and the objective lens 33 for separating the optical path of the return light reflected by the optical disc 2 from the optical path of the optical beam emitted from the light source 31 as optical path separating means, and a masking member 36 having a masking unit 36a arranged between the beam splitter 35 and the photo-detector 34 for shielding part of the passing-through optical beam.

The optical pickup 7 also includes a collimator lens 37 arranged between the light source 31 and the beam splitter 35 for roughly collimating the optical beam emitted from the light source 31 by changing the divergence angle thereof and a condenser lens 38 arranged between the beam splitter 35 and the photo-detector 34 for condensing the return light reflected by the beam splitter 35 on the light receiving section 34a of the photo-detector 34.

The light source 31 may include semiconductor laser for emitting a laser flux with a wavelength of about 405 nm. The wavelength of the optical beam emitted from the light source 31 is not limited to about 405 nm, so that it may be about 650 nm and about 780 nm, for example. A case where the optical beam with a single wavelength is emitted will be described below; alternatively, one or a plurality of light sources for emitting optical beams with two or more kinds of the wavelength may also be provided.

The collimator lens 37 roughly collimates the incident optical beam from the light source 31 by changing the divergence angle thereof so as to emit the beam toward the beam splitter 35.

The beam splitter 35 reflects the optical beam on an approach route incident therein as roughly parallel light collimated by the collimator lens 37 so as to emit the beam toward the objective lens 33. Simultaneously, the beam splitter 35 transmits the return optical beam incident therein by reflected on the recording layer of the optical disc 2 via the objective lens 33 (also referred to as "the optical beam on a way back route" below) so as to emit the beam toward the masking member 36. In such a manner, the beam splitter 35 separates the optical path of the optical beam on the way back route from that of the optical beam on the approach route so as to lead the optical beam to the masking member 36, the condenser lens 38, and the light receiving section 34a.

The objective lens 33 has a numerical aperture NA corresponding to the kind of the optical disc 2, and the numerical aperture NA is about 0.85, for example. The objective lens 33 condenses the optical beam incident on a desired recording layer of the optical disc 2 (signal recording surface). The numerical aperture of the objective lens is not limited to about 0.85 but it corresponds to the kind of the optical disc 2, so that it may be about 0.6 or about 0.45, for example.

Figure 4:
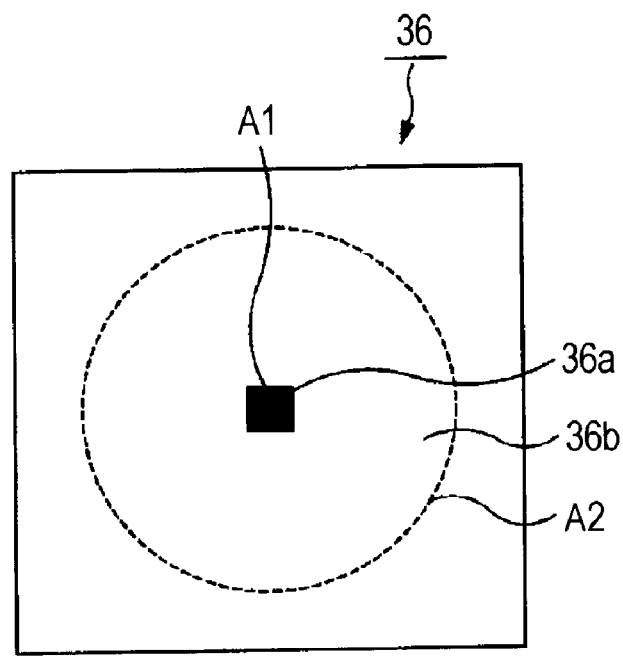
FIG. 4 is a plan view of a masking member constituting the optical pickup.

The masking member 36, as shown in FIG. 4, includes the masking unit 36a for shielding part of the return optical beam to be incident in the masking member 36 after transmitting through the beam splitter 35 and a transmission unit 36b formed on a portion of the masking member 36 other than the masking unit 36a for transmitting the incident optical beam as it is. In FIG. 4, the roughly circular region surrounded by a broken line shows the return light from the recording layer for recording/reproducing information.

Figure 5:
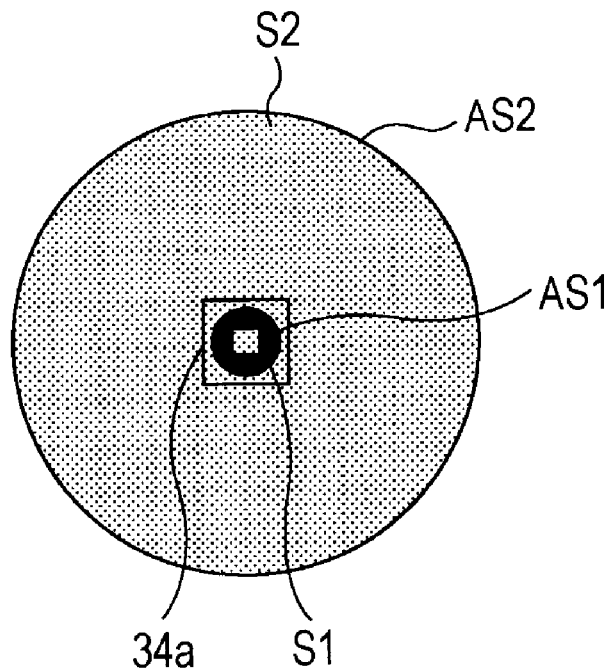
FIG. 5 is a plan view showing a state in that spots of return optical beams from a focus recording layer and the other recording layers are formed on a plane arranged flush with a light-receiving section of a photo-detector constituting the optical pickup.
Figure 6:
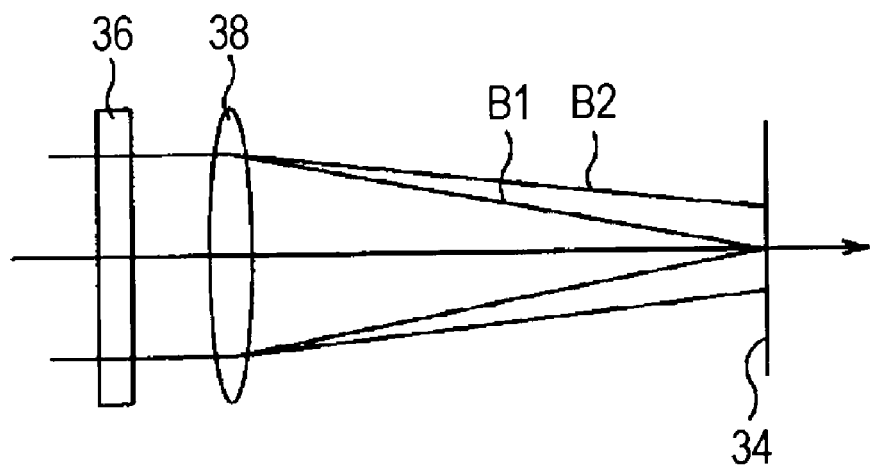
FIG. 6 is a schematic side view of the masking member, a condenser lens, and the light-receiving section constituting the optical pickup, for illustrating a state of the return optical beams from the focus recording layer and the other recording layers condensed on the light-receiving section.

The masking unit 36a of the masking member 36, as shown in FIGS. 5 and 6, shields the central region of the optical beam to be incident in the light receiving section 34a among optical beams $B_2$ reflected by other recording layers or surfaces (also referred to "other recording layers below") different from a recording layer for recording/reproducing information (also referred to as a "focus recording layer" below). In FIG. 6, character B1 denotes the optical beam reflected by the focus recording layer and character B2 denotes the optical beams reflected by the other recording layers. In FIG. 5, character S1 shows the spot formed by the optical beam reflected by the focus recording layer and character S2 shows spots formed by the optical beams reflected by the other recording layers. The masking unit 36a of the masking member 36 is formed roughly at the center of the masking member 36 in a substantially rectangular shape. The masking unit 36a is arranged so that its center matches the optical axis for shielding the central region of the optical beam to be incident in the light receiving section 34a among optical beams. The shape of the masking unit 36a is not limited to be substantially rectangular but it may also be circular, elliptical, or polygonal. The bilayered optical disc having two recording layers has been exemplified herein; alternatively, on/from the optical disc having a single recording layer, information may be recorded and/or reproduced. In this case, the masking unit 36a of the masking member 36 shields the central region of the optical beam to be incident in the light receiving section 34a so as not to admit it in the light receiving section 34a among the optical beams reflected by surfaces of the optical disc 2.

By shielding the central region of the optical beam to be incident in the light receiving section 34a among the optical beams reflected by the other recording layers, the masking member 36 prevents major part of the optical beam to be stray light, i.e., part thereof largely affecting noise, from entering the light receiving section 34a. Thereby noise components are largely reduced in comparison with the case without the masking member 36. The masking member 36 also reduces the optical power loss largely in comparison with the case where shielding all the optical beam to be incident in the light receiving section 34a among the optical beams reflected by the other recording layers.

Namely, the masking member 36 largely reduces the optical power loss as well as reduces the noise components.

Specifically, the size of the masking unit 36a is defined so that the spot size ratio of the optical beam from the focus recording layer to the optical beams from the other recording layers on the plane where the light receiving section 34a is formed is larger than the size ratio of the optical beam incident to the masking member 36 to the masking unit 36a. That is, as shown in FIGS. 4 to 6, when the area of the masking unit 36a on the plane perpendicular to the optical axis is designated as A1; the area of the optical beam reflected by the focus recording layer to be incident to the masking member 36 on the plane perpendicular to the optical axis is designated as A2; the area of the spot S1 of the optical beam reflected by the focus recording layer on the plane where the light receiving section 34a is formed is designated as AS1; and the area of the spots S2 of the optical beam reflected by the other recording layers on the plane where the light receiving section 34a is formed is designated as AS2, the size of the masking unit 36a is determined to satisfy the following relationship:

$(A1/A2)<(AS1/AS2)$.

In the case of an optical disc having three or more recording layers, the area S2 is that of the spot of the optical beam reflected by the recording layer nearest to the focus recording layer among the optical beams reflected by the other recording layers on the plane where the light receiving section 34a is formed. This is because the optical beam reflected by the recording layer nearest to the focus recording layer has the maximum influence on the noise as stray light. In the case of an optical disc having only a recording monolayer, the area S2 is that of the spot of the optical beam reflected by the surface on the plane where the light receiving section 34a is formed.

Furthermore, the masking unit 36a of the masking member 36 is formed to have a size capable of preventing part of the optical beam, corresponding to the innermost peripheral region of the interference fringes formed on the light receiving section 34a by the optical beam reflected by the focus recording layer among the optical beams reflected by the other recording layers and the optical beams reflected by the other recording layers, from entering the light receiving section 34a. The innermost peripheral region of the interference fringes herein means the innermost pair of bright and dark regions in the interference fringes formed by repeating bright and dark stripes.

As described above, by preventing the interference at the influential central part in the optical beams interfering between the optical beam reflected by the focus recording layer and the optical beams reflected by the other recording layers, the essential part of the noise component is prevented as well as the optical power loss can be averted.

The prevention of interfering between the optical beam reflected by the focus recording layer and the optical beams reflected by the other recording layers by the masking unit 36a will be described. In advance of the description, the interfering phenomenon will be described.

Figure 7:
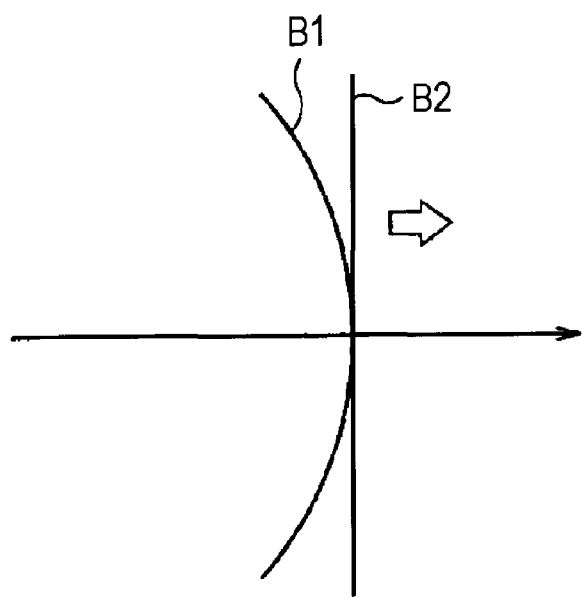
FIG. 7 is a drawing for illustrating the optical path difference between a return optical beam from the focus recording layer to be condensed on the light-receiving section and a return optical beam from the other recording layers.
Figure 8:
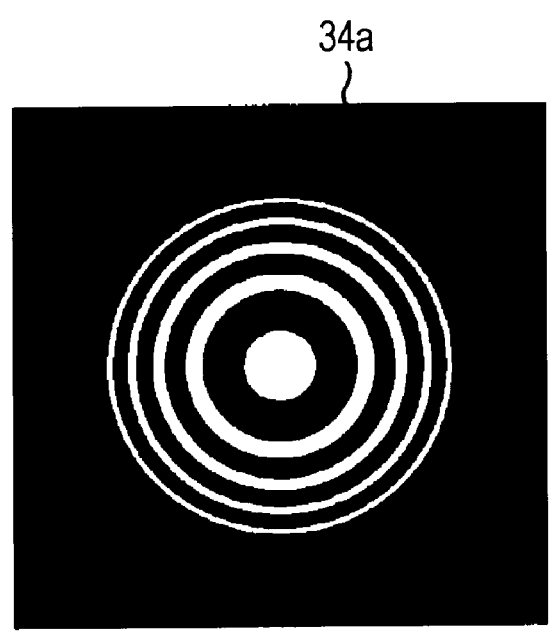
FIG. 8 is a plan view of the light-receiving section constituting the optical pickup for schematically showing interference fringes formed by the optical path difference between a return optical beam from the focus recording layer to be condensed on the light-receiving section and a return optical beam from the other recording layers.

As shown in FIG. 7, the wavefront of an optical beam B1 from the focus recording layer is a curved surface while the wavefront of an optical beam B2 from the other recording layer is a roughly flat surface. These two optical beams form interference fringes on the light receiving section 34a by so-called Newton rings principle as shown in FIG. 8. That is, a portion where the optical-path difference is an integral multiple of the wavelength becomes bright by the optical power intensified with each other while a portion where the optical-path difference is displaced by a half-wavelength from the integral multiple becomes dark by the optical power weakened with each other, so that the interference fringes is generated in accordance with the optical-path difference as shown in FIG. 8. FIG. 8 schematically shows dark and bright portions; strictly speaking, portions with optical power intermediate between bright and dark exist in accordance with the displacement from the integral multiple of the wavelength in the optical-path difference so that the brightness gradually changes in accordance with the optical-path difference and the interference fringes with bright and dark portions is consequently formed. In the interference fringes, the change in optical-path difference is small at the central portion, and with separating distance from the center, the change in optical-path difference gradually increases, so that the central portion is roughest, and with separating distance from the center, the state becomes denser.

At this time, the spaces between the focus recording layer and the other recoding layers change very little in accordance with the position on the plane of the optical disc, so that the bright/dark state of the interference fringes is changed due to the micro changes. Namely, the bright/dark state sequentially changes across the case where the bright and dark portions are formed as shown in FIG. 8 and the case where the bright and dark portions are turned over. By the sequential change of the bright/dark state, the roughest central region is considered to be the major cause of the noise component due to the interference.

By shielding the central roughest bright and dark portions of the light receiving section 34a, which mainly cause the noise component, with the masking unit 36a, the noise component can be minimized in requirement although not completely, as well as the optical power loss can be prevented.

In other words, the masking unit 36a also improves the situation in that by shielding the entire return light portion to be incident in the light receiving section 34a from the other recording layers, the return light portion from the focus recording layer, which needs to be originally detected, is largely shielded so as to have the large optical power loss. Thereby, the degree of influence of the stray light to be the noise component is reduced to the utmost as well as the optical power loss can also be reduced as small as possible.

The interlayer distance can also be reduced especially in the optical disc employing a short-wavelength ray. The influence of the stray light and the optical power loss become a problem especially when the interlayer distance is small; whereas, the masking member 36 prevents the stray light from the other recording layers as well as reduces the optical power loss, enabling the preferable recording/reproducing by largely reducing the noise component when the optical disc employing a short-wavelength ray is structured in multiple layers so as to increase the recording capacity and to reduce the degree of influence of the stray light.

In the above-mentioned optical pickup 7, the masking member 36 having the masking unit 36a for shielding part of the optical beam passing therethrough is provided; however, the invention is not limited to this, and for example, a masking member having a diffracting unit for diffracting part of the optical beam passing therethrough may be provided. The diffracting unit of this masking member may diffract the central region of the optical beam incident in the light receiving section 34a among the optical beams reflected by the other recording layers different from the focus recording layer so as not to admit the central region to the light receiving section 34a. In other words, an optical-beam incidence restricting unit may be provided for restricting the central region of the optical beam incident in the light receiving section 34a among the optical beams reflected by the other recording layers so as not to admit the central region to the light receiving section 34a.

The condenser lens 38 converts the divergence angle of the optical beam on the way back route incident therein by shielding part of the optical beam with the masking member 36 so as to converge the optical beam onto the light receiving regions of the light receiving section 34a at a predetermined divergence angle.

The photo-detector 34 includes a light-receiving element having the light receiving section 34a formed at the center in a roughly square shape for detecting the incident optical beam and a light non-receiving section 34b provided in the portion other than the light receiving section 34a for not detecting the optical beam. The photo-detector 34 detects the optical beam received by the light receiving section 34a of the light-receiving element.

The photo-detector 34 is configured as a so-called divisional photo-detector having the light receiving section 34a composed of a plurality of light-receiving regions for detecting various signals, such as a tracking-error signal and a focusing-error signal, along with information signals. The photo-detector 34 receives the optical beam condensed by the condenser lens 38 for detecting such signals.

In the optical pickup 7 configured as described above, upon emitting an optical beam from the light source 31, the optical beam is collimated by the collimator lens 37; it is reflected toward the objective lens 33 by the beam splitter 35; and it is condensed by the objective lens 33 to form a spot on the focus recording layer of the optical disc 2. The optical beam condensed on the recording layer is reflected to again enter the beam splitter 35, and its optical path is changed by the beam splitter 35, so that the optical beam is condensed on the light receiving section 34a of the photo-detector 34 after passing through the masking member 36 and the condenser lens 38.

Figure 9:
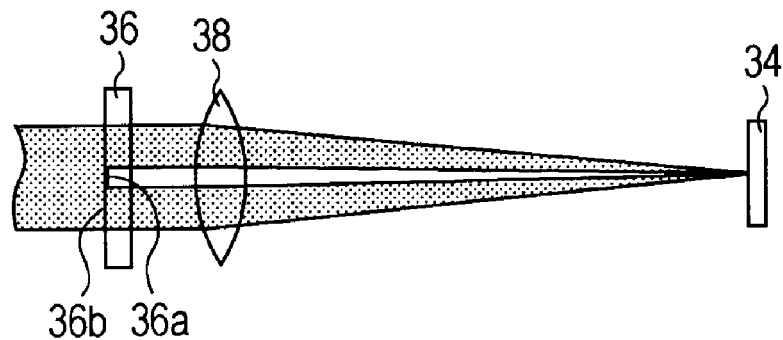
FIG. 9 is a conceptual side view of the masking member, the condenser lens, and the light-receiving section constituting the optical pickup, for showing a state of optical beams reflected by the recording layer for recording/reproducing information (focus recording layer)
Figure 10A:
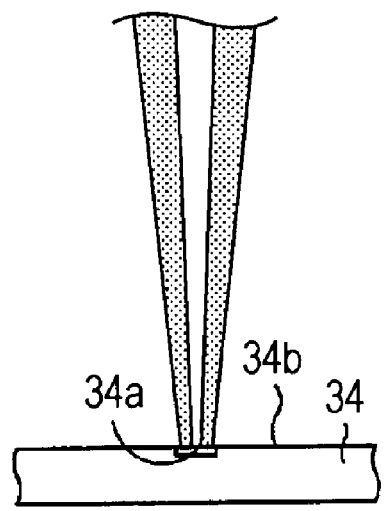
Figure 10B:
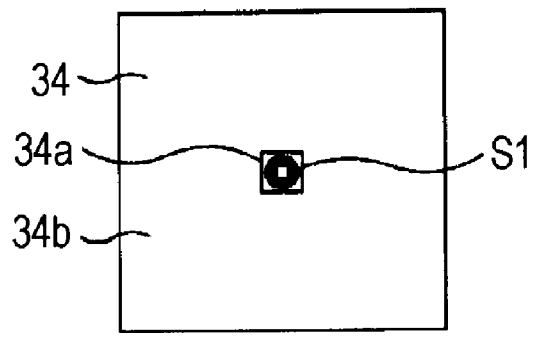

At this time, when the optical beam is condensed on the recording layer L1 as the focus recording layer, as shown in FIGS. 9, 10A, and 10B, the optical beam condensed on the recording layer L1 is condensed on the light receiving section 34a of the light-receiving element by the condenser lens 38 except the portion shielded by the masking unit 36a.

Figure 11:
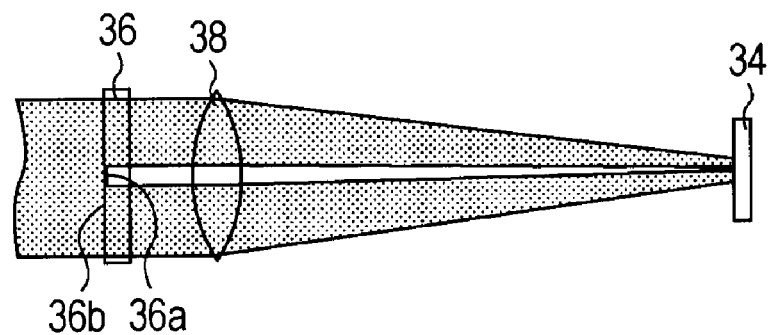
FIG. 11 is a conceptual side view of the masking member, the condenser lens, and the light-receiving section constituting the optical pickup, for showing a state of optical beams reflected by recording layers not doing the recording/reproducing information (the other recording layers)
Figure 12A:
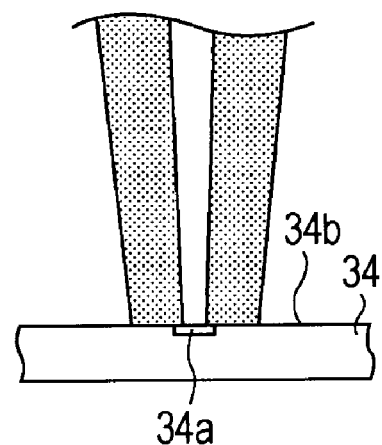
Figure 12B:
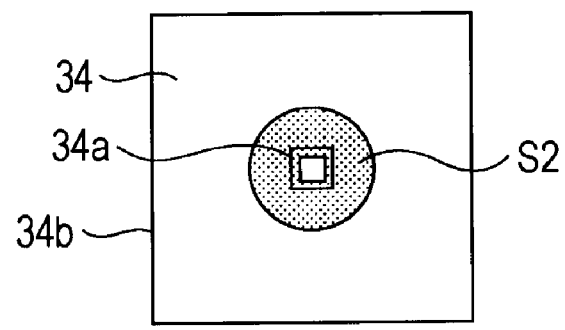

Simultaneously, the optical beam reflected by the other recording layer L2 also proceeds toward the light-receiving element via the masking member 36 and the condenser lens 38; however, as shown FIGS. 11, 12A, and 12B, part of the optical beam is shielded by the masking unit 36a while the other part, which is not shielded by the masking unit 36a, enters the light receiving section 34a and the light non-receiving section 34b. Thus, the optical beam on the central region among the optical beams reflected by the recording layers to proceed toward the light receiving section 34a does not enter the light receiving section 34a, while beams on other regions are incident therein.

The optical pickup 7 according to the embodiment of the present invention includes the light source 31, the photo-detector 34, the beam splitter 35, and the masking member 36. Since the masking unit 36a of the masking member 36 shields the central region of the optical beam to be incident in the light receiving section 34a among the optical beams reflected by the other recording layers or surfaces different from the recording layer for recording/reproducing information, the noise component and the loss in the optical power can be largely reduced.

In the above-description, the masking member 36 is provided with the masking unit 36a formed in a roughly rectangular shape in the vicinity of the optical axis; however, the invention is not limited to this, and for example, in an optical pickup diving an optical beam into three beams for detecting a tracking-error signal with a diffraction grating, a plurality of masking units may be provided as follows.

Figure 13:
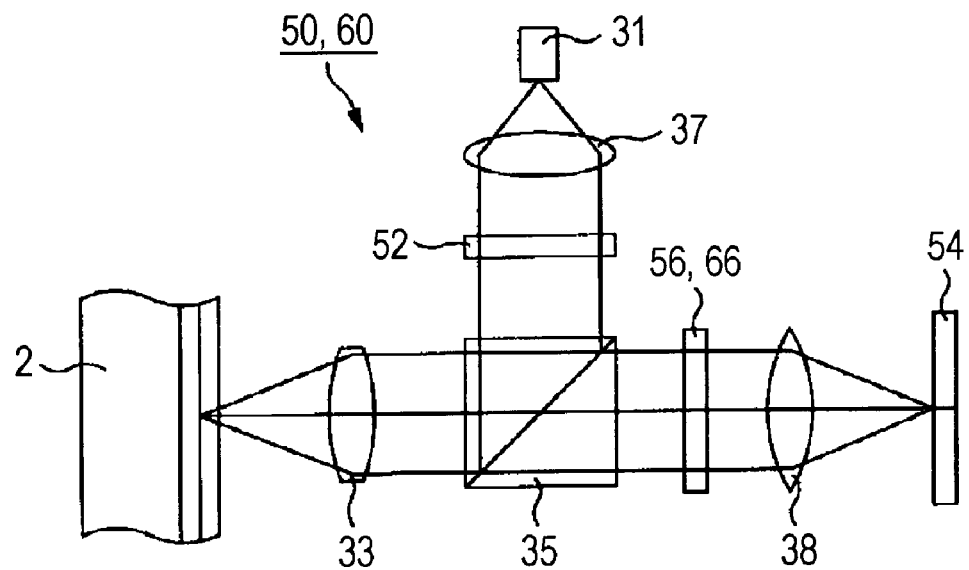
FIG. 13 is an optical path diagram for illustrating the optical system of an optical pickup according to another embodiment.

Then, as shown in FIG. 13, an optical pickup will be described that includes a diffraction element for dividing the optical beam emitted from the light source 31 into three beams, a photo-detector having a plurality of light receiving sections for respectively receiving the three return beams reflected by the recording layer of the optical disc and divided with the diffraction grating, and a masking member having a plurality of masking units for respectively shielding optical beams to be incident in the plurality of light receiving sections among the optical beams reflected by the other recording layers. In the following description, like characters designate like components common to the optical pickup 7 described above, and the detailed description is omitted.

An optical pickup 50 according to another embodiment of the present invention, as shown in FIG. 13, includes the light source 31, a diffraction grating 52 for dividing the optical beam emitted from the light source 31 into at least three beams, the objective lens 33 for respectively condensing the at least three optical beams divided by the diffraction grating 52 on the recording layer of the optical disc 2, a photo-detector 54 having light receiving sections 54a, 54b, and 54c for respectively receiving the three return beams reflected by the recording layer of the optical disc 2, the beam splitter 35, a masking member 56 having masking units 56a, 56b, and 56c arranged between the beam splitter 35 and the photo-detector 54 for shielding part of passing-through optical beams, the collimator lens 37 arranged between the light source 31 and the diffraction grating 52, and the condenser lens 38.

The diffraction grating 52 is arranged between the collimator lens 37 and the beam splitter 35 for dividing the optical beam emitted from the light source 31 and roughly collimated by the collimator lens 37 into three optical beams composed of a main beam that is 0-order light to be transmitted as it is and ±1st-order diffracted light branched off from the main beam at a predetermined angle of diffraction and composed of first and second sub-beams. Then, the three divided optical beams are led toward the beam splitter 35.

Figure 14:
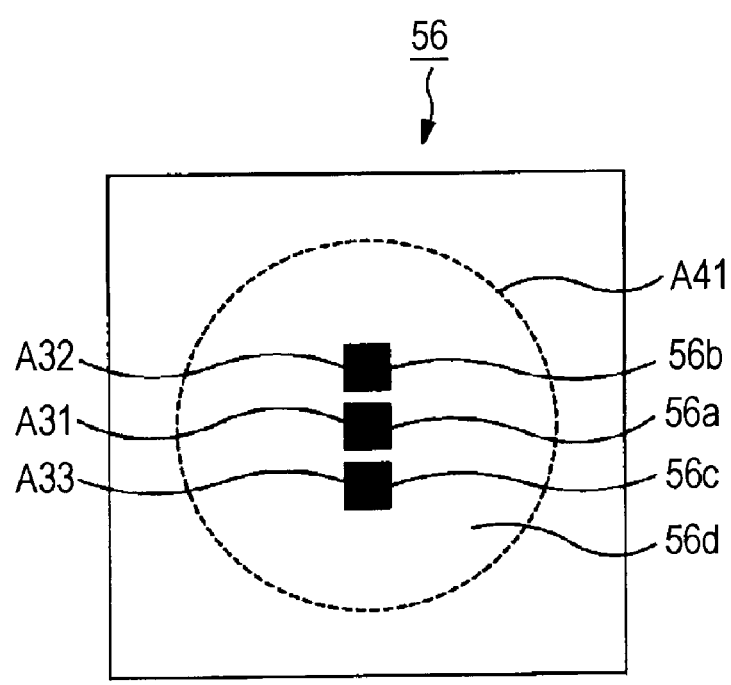
FIG. 14 is a plan view of another example of the masking member constituting the optical pickup.

The masking member 56, as shown in FIG. 14, includes a plurality of the masking units 56a, 56b, and 56c for shielding part of passing-through optical beams, which are incident return optical beams after passing through the beam splitter 35, and a transmitting unit 56d provided in a portion of the masking member 56 other than the masking units 56a, 56b, and 56c for transmitting the incident optical beam as it is. In FIG. 14, a roughly circular broken line shows return light from the recording layer recording/reproducing information.

Figure 15:
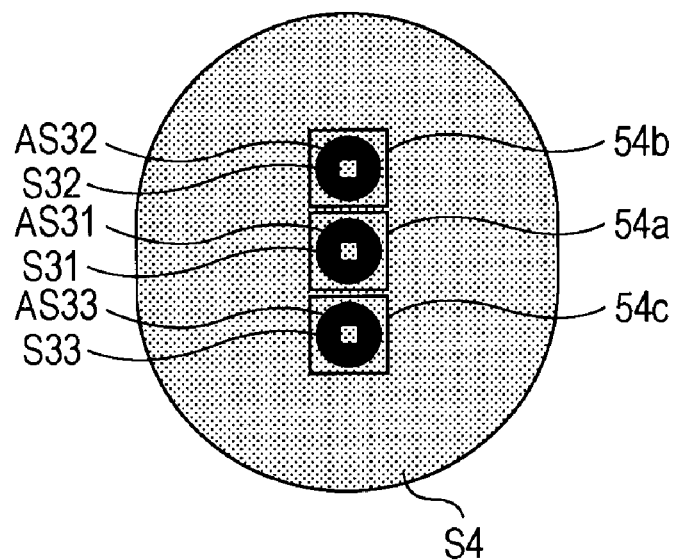
FIG. 15 is a plan view showing a state in that spots of return optical beams from a focus recording layer and the other recording layers are formed on a plane arranged flush with a light-receiving section of a photo-detector constituting the optical pickup having the masking member shown in FIG. 14.

The masking units 56a, 56b, and 56c of the masking member 56, as shown in FIGS. 14 and 15, shield the central regions of optical beams to be incident in the light receiving sections 54a, 54b, and 54c, respectively, among the optical beams reflected by the other recording layers. In FIG. 15, character S31 denotes a spot formed by the main beam reflected from the focus recording layer; character S32 a spot formed by the first sub-beam reflected from the focus recording layer; and character S33 a spot formed by the second sub-beam reflected from the focus recording layer. The masking unit 56a of the masking member 56 herein is formed at the roughly center portion of the masking member 56 in a roughly rectangular shape coaxially with the optical axis; the masking units 56b and 56c are formed in a roughly rectangular shape and arranged on both sides about the line connecting the three divided optical beams. The masking units 56*b* and 56*c* are herein arranged at positions respectively shielding optical beams to be incident in the light receiving sections 54*a*, 54*b*, and 54*c*, which will be described later, among the return optical beams, which are the three optical beams divided by the diffraction grating 52, reflected from the other recording layers. In addition, the masking units 56*a*, 56*b*, and 56*c* are herein formed in a rectangular shape; however, the invention is not limited to this, so that they may also be formed in circular, elliptical, and polygonal shapes.

The masking member 56 prevents the main part of the optical beam to be stray light, which largely affects noise, from entering the light receiving sections 54*a*, 54*b*, and 54*c* by shielding the respective central regions of the optical beams to be incident in the light receiving sections 54*a*, 54*b*, and 54*c* among the optical beams reflected by the other recording layers. Thereby, the noise component is largely reduced smaller than in the case where the masking member 56 is not provided, and the optical power loss is largely reduced smaller than in the case where the entire optical beams to be incident in the light receiving sections 54*a*, 54*b*, and 54*c* are shielded among the optical beams reflected by the other recording layers.

That is, the masking member 56 largely reduces the optical power loss as well as reduces the generation of noise components.

Specifically, the sizes of the masking units 56*a*, 56*b*, and 56*c* of the masking member 56 are defined so that the spot size rate of the optical beams reflected by the focus recording layer on the plane where the light receiving sections 54*a*, 54*b*, and 54*c* are formed to the optical beams reflected by the other recording layers on the plane where the light receiving sections 54*a*, 54*b*, and 54*c* are formed is larger than the size rate of the masking units 56*a*, 56*b*, and 56*c* to the optical beams incident in the masking member 56.

Namely, as shown in FIGS. 14 and 15, when the area of the masking unit 56*a* on a plane perpendicular to the optical axis is designated as A31; the area of the masking unit 56*b* on a plane perpendicular to the optical axis as A32; the area of the masking unit 56*c* on a plane perpendicular to the optical axis as A33; the area of the main beam reflected by the focus recording layer to be incident in the masking member 56 on a plane perpendicular to the optical axis as A41; the area of the first sub-beam reflected by the focus recording layer to be incident in the masking member 56 on a plane perpendicular to the optical axis as A42; the area of the second sub-beam reflected by the focus recording layer to be incident in the masking member 56 on a plane perpendicular to the optical axis as A43; the area of the spot S31 of the main beam reflected by the focus recording layer on a plane where the light receiving section 54*a* is formed as AS31; the area of the spot S32 of the first sub-beam reflected by the focus recording layer on a plane where the light receiving section 54*b* is formed as AS32; the area of the spot S33 of the second sub-beam reflected by the focus recording layer on a plane where the light receiving section 54*c* is formed as AS33; and the area of the spots of the main beams reflected by the other recording layers on a plane where the light receiving sections 54*a*, 54*b*, and 54*c* are formed as AS41, the size of the masking unit 56*a* is determined to satisfy the relationship: (A31/A41) <(AS31/AS41), the size of the masking unit 56*b* is determined to satisfy the relationship: (A32/A42)<(AS32/AS41), the size of the masking unit 56*c* is determined to satisfy the relationship: (A33/A43)<(AS33/AS41). Although not shown in FIG. 14 because the areas A42 and A43 substantially overlap with the area A41, strictly speaking, the beams, each having a similar area to the area A41, are formed to slightly deviate in the arranging direction of the masking units 56*a*, 56*b*, and 56*c*, i.e., the diffracting direction of the first and second sub-beams. In FIG. 15, the spot S4 is the spot formed by overlapping the spots of the main beams reflected by the other recoding layers on a plane where the light receiving sections 54*a*, 54*b*, and 54*c* are formed with the spots of the first and second sub-beams reflected by the other recoding layers on a plane where the light receiving sections 54*a*, 54*b*, and 54*c* are formed.

The main beam and the first and second sub-beams reflected by the other recording layers may enter the light receiving sections 54*a*, 54*b*, and 54*c*, respectively. However, the reason why the denominator of the right side of each of the above-relation expressions is to be AS41, which is the area of the main beam, is that the optical power of the main beam is larger than the each power of the first and second sub-beams, so that it is the main beam of the optical beams reflected by the other recording layers to mainly affect the optical beams reflected by the focus recording layer to be incident in the light receiving sections 54*a*, 54*b*, and 54*c* by interfering with them.

Furthermore, the sizes of the masking units 56*a*, 56*b*, and 56*c* of the masking member 56 are defined so that the optical beams reflected by the other recording layers and the optical beam reflected by the focus recording layer among the other-layer optical beams reflected by the other recording layers shield the portions corresponding to the inner most regions of the interference fringes formed on the light receiving sections 54*a*, 54*b*, and 54*c* so as not to admit them in the light receiving sections 54*a*, 54*b*, and 54*c*, respectively. The inner most region of the interference fringes herein means the innermost pair of bright and dark regions in the interference fringes formed by repeating bright and dark stripes.

Thereby, as described above, by preventing the interference due to the largely effective central region among portions of the optical beam reflected by the focus recording layer interfering with the optical beams reflected by the other recording layers, the main part of the noise component can be prevented to largely reduce the generation of the noise component as well as the optical power loss can be prevented.

The prevention of the interference between the optical beam reflected by the focus recording layer and the optical beams reflected by the other recording layers by the masking units 56*a*, 56*b*, and 56*c* of the masking member 56 is the same in manner as in the optical pickup 7 described above, so that detailed description is omitted.

In such a manner, the masking units 56*a*, 56*b*, and 56*c* of the masking member 56 shield the roughest bright and dark regions, where are mainly affecting the noise component, in the vicinities of the centers of the light receiving sections 54*a*, 54*b*, and 54*c*, so that the noise component can be minimized in requirement largely although not completely, as well as the optical power loss can be prevented.

In other words, the masking units 56*a*, 56*b*, and 56*c* of the masking member 56 improve the situation in that by shielding the entire return light portions to be incident in the light receiving sections 54*a*, 54*b*, and 54*c* from the other recording layers, the return light portion from the focus recording layer is also largely shielded so as to have the large optical power loss. Thereby, the degree of influence of the stray light becoming the noise component is reduced to the utmost as well as the optical power loss can also be reduced as small as possible.

The photo-detector 54 includes a light-receiving element having the light receiving section 54*a* formed at the center in a roughly square shape for detecting the incident return main beam, the light receiving sections 54*b* and 54*c* formed at positions opposing each other with the light receiving section 54a therebetween for detecting the incident return first and second sub-beams, respectively, and a light non-receiving section 54d provided in the portion other than the light receiving sections 54a, 54b, and 54c for not detecting the optical beam. The photo-detector 54 detects the optical beams received by the light receiving sections 54a, 54b, and 54c of the light-receiving element. The light receiving section 54a is formed at a position capable of receiving the return main beam; the light receiving section 54b is formed at a position capable of receiving the return first sub-beam; and the light receiving section 54c is formed at a position capable of receiving the return second sub-beam.

The photo-detector 54 is configured as a photo-detector composed of the light receiving sections 54a, 54b, and 54c, each having one light-receiving region, or as a so-called divisional photo-detector composed of a plurality of light-receiving regions, for detecting various signals, such as information signals, a tracking-error signal, and a focusing-error signal by receiving returned light from the main beam and the first and second sub-beams condensed by the condensing lens 38.

The light receiving section 54a for receiving the main beam, the light receiving section 54b for receiving the first sub-beam, and the light receiving section 54c for receiving the second sub-beam are separately configured; however, the invention is not limited to this, so that the light receiving sections 54a, 54b, and 54c may be arranged without a space to form the so-called divisional photo-detector composed of a plurality of light-receiving regions. One or a plurality of light-receiving regions among the plurality of light-receiving regions may also function as the three light receiving sections. Namely, a light receiving unit integrally made of the light receiving sections 54a, 54b, and 54c may also be provided.

In the optical pickup 50 configured as described above, upon emitting an optical beam from the light source 31, the optical beam is collimated by the collimator lens 37; it is divided into three beams by the diffraction grating 52; they are reflected toward the objective lens 33 by the beam splitter 35; and they are condensed by the objective lens 33 to form spots on the focus recording layer of the optical disc 2. The optical beams condensed on the recording layer are reflected to again enter the beam splitter 35, and their optical paths are changed by the beam splitter 35, so that the optical beams are condensed on the light receiving sections 54a, 54b, and 54c of the photo-detector 54, respectively, after passing through the masking member 56 and the condenser lens 38.

The optical pickup 50 according to the embodiment includes the light source 31, the diffraction grating 52, the objective lens 33, the photo-detector 54, the beam splitter 35, and the masking member 56. Since the masking units 56a, 56b, and 56c of the masking member 56 shield the central regions of the optical beams to be incident in the light receiving sections 54a, 54b, and 54c, respectively, among the optical beams reflected by the other recording layers or surfaces different from the recording layer for recording/reproducing information, the noise component and the loss in the optical power can be largely reduced.

In the optical pickup 50 described above, for detecting the tracking error signal and so forth with the diffraction grating, an optical beam is divided into three beams and the masking member having a plurality of masking units is provided; the invention is not limited to this, so that for detecting the tracking error signal and so forth with the diffraction grating, an optical beam may be divided into three beams and a masking member formed in one elongated shape may be provided for shielding the optical beams to be incident in a plurality of light-receiving sections among the optical beams reflected by the other recording layers.

Figure 16:
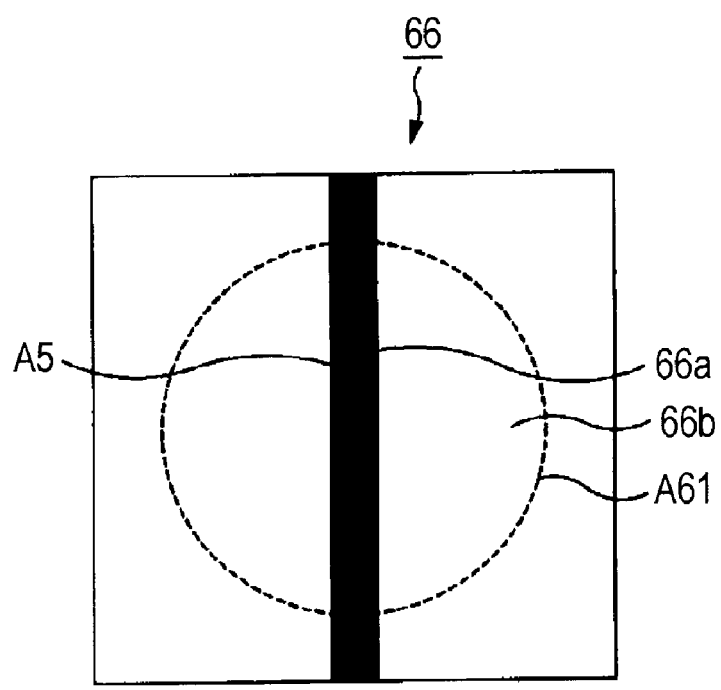
FIG. 16 is a plan view of still another example of the masking member constituting the optical pickup.

Then, as shown in FIGS. 13 and 16, an optical pickup will be described that includes a diffraction element for dividing the optical beam emitted from the light source 31 into three beams, a photo-detector having a plurality of light receiving sections for respectively receiving the three return beams reflected by the recording layer of the optical disc and divided with the diffraction grating, and a masking member having one masking unit for shielding the optical beams to be incident in the plurality of light receiving sections among the optical beams reflected by the other recording layers. In the following description, the configuration is common to that of the optical pickup 50 other than that a masking member 66 is provided instead of the masking member 56, so that like characters designate like components common to the optical pickups 7 and 50 described above, and the detailed description is omitted.

An optical pickup 60 according to still another embodiment, as shown in FIG. 13, includes the light source 31, the diffraction grating 52, the objective lens 33, the photo-detector 54, the beam splitter 35, a masking member 66 having a masking unit 66a arranged between the beam splitter 35 and the photo-detector 54 for shielding part of passing-through optical beams, the collimator lens 37, and the condenser lens 38.

The masking member 66, as shown in FIG. 16, includes one masking unit 66a for shielding part of passing-through optical beams, which are incident return optical beams after passing through the beam splitter 35, and a transmitting unit 66b provided in a portion of the masking member 66 other than the masking unit 66a for transmitting the incident optical beam as it is. In FIG. 16, a roughly circular broken line shows return light from the recording layer recording/reproducing information.

Figure 17:
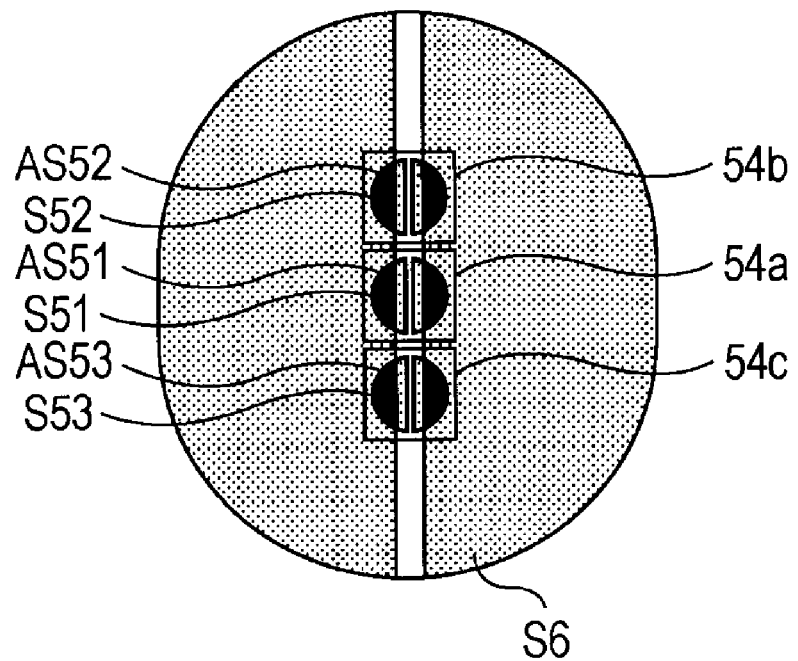
FIG. 17 is a plan view showing a state in that spots of return optical beams from a focus recording layer and the other recording layers are formed on a plane arranged flush with a light-receiving section of a photo-detector constituting the optical pickup having the masking member shown in FIG. 16.

The masking unit 66a of the masking member 66, as shown in FIGS. 16 and 17, shields the central regions of optical beams to be incident in the light receiving sections 54a, 54b, and 54c among the optical beams reflected by the other recording layers. In FIG. 17, character S51 denotes a spot formed by the main beam reflected from the focus recording layer; character S52 a spot formed by the first sub-beam reflected from the focus recording layer; and character S53 a spot formed by the second sub-beam reflected from the focus recording layer. The masking unit 66a of the masking member 66 herein is formed in an elongated rectangular shape coaxially with the optical axis and directing its longer side in a direction connecting the three divided optical beams. The masking unit 66a is herein arranged at a position shielding optical beams to be incident in the light receiving sections 54a, 54b, and 54c, which will be described later, among the return optical beams, which are the three optical beams divided by the diffraction grating 52, reflected from the other recording layers.

The masking member 66 prevents the main part of the optical beam to be stray light, which largely affects noise, from entering the light receiving sections 54a, 54b, and 54c by shielding the respective central regions of the optical beams to be incident in the light receiving sections 54a, 54b, and 54c among the optical beams reflected by the other recording layers. Thereby, the noise component is largely reduced smaller than in the case where the masking member 66 is not provided, and the optical power loss is largely reduced smaller than in the case where the entire optical beams to be incident in the light receiving sections 54a, 54b, and 54c are shielded among the optical beams reflected by the other recording layers.

That is, the masking member 66 largely reduces the optical power loss as well as reduces the generation of noise components.

Specifically, the size of the masking unit 66a of the masking member 66 is determined so that the spot size rate of the optical beams reflected by the focus recording layer on the plane where the light receiving sections 54a, 54b, and 54c are formed to the optical beams reflected by the other recording layers on the plane where the light receiving sections 54a, 54b, and 54c are formed is larger than the size rate of the masking unit 66a to the optical beams incident in the masking member 56.

Namely, as shown in FIGS. 16 and 17, when the area of the portion of the masking unit 66a, where the main beam reflected by the focus recording layer enters, on a plane perpendicular to the optical axis is designated as A5; the area of the main beam reflected by the focus recording layer to be incident in the masking member 66 on a plane perpendicular to the optical axis as A61; the sum of areas of the main beam and the first and second sub-beams reflected by the focus recording layer on a plane perpendicular to the optical axis as AS5; and the area of the spots of the main beams reflected by the other recording layers on a plane where the light receiving sections 54a, 54b, and 54c are formed as AS61, the size of the masking unit 66a is determined to satisfy the relationship: (A5/A61)<(AS5/AS61). The area AS5 herein is the sum of the spot area AS51 of the main beam reflected by the focus recording layer on a plane where the light receiving section 54a is formed, the spot area AS52 of the first sub-beam reflected by the focus recording layer on a plane where the light receiving section 54b is formed, and the spot area AS53 of the second sub-beam reflected by the focus recording layer on a plane where the light receiving section 54c is formed. Although not shown in FIG. 16 because the areas A62 and A63 of the first and second sub-beams reflected by the focus recording layer incident in the masking member 66 on a plane perpendicular to the optical axis substantially overlap with the area A61, strictly speaking, the beams, each having a similar area to the area A61, are formed to slightly deviate in the longitudinal direction of the masking unit 66a, i.e., the diffracting direction of the first and second sub-beams. In FIG. 17, the spot S6 is the spot formed by overlapping the spots of the main beams reflected by the other recoding layers on a plane where the light receiving sections 54a, 54b, and 54c are formed with the spots of the first and second sub-beams reflected by the other recoding layers on a plane where the light receiving sections 54a, 54b, and 54c are formed.

The main beam and the first and second sub-beams reflected by the other recording layers may enter the light receiving sections 54a, 54b, and 54c, respectively. However, the reason why the denominator of the right side of the above-relation expression is to be AS61, which is the area of the main beam, is that the optical power of the main beam is larger than the each power of the first and second sub-beams, so that it is the main beam of the optical beams reflected by the other recording layers to mainly affect the optical beams reflected by the focus recording layer to be incident in the light receiving sections 54a, 54b, and 54c by interfering with them. The reason why the denominator of the left side is to be A61, which is the area of the main beam, is that the area of the main beam reflected by the focus recording layer to be incident in the masking member 66 substantially equals to the respective areas of the first and second sub-beams.

Furthermore, the size of the masking unit 66a of the masking member 66 is defined so that the optical beams reflected by the other recording layers and the optical beam reflected by the focus recording layer among the other-layer optical beams reflected by the other recording layers shield the portions corresponding to the inner most regions of the interference fringes formed on the light receiving sections 54a, 54b, and 54c so as not to admit them in the light receiving sections 54a, 54b, and 54c, respectively. The inner most region of the interference fringes herein means the innermost pair of bright and dark regions in the interference fringes formed by repeating bright and dark stripes.

Thereby, as described above, by preventing the interference due to the largely effective central region among portions of the optical beam reflected by the focus recording layer interfering with the optical beams reflected by the other recording layers, the main part of the noise component can be prevented to largely reduce the generation of the noise component as well as the optical power loss can be prevented.

The prevention of the interference between the optical beam reflected by the focus recording layer and the optical beams reflected by the other recording layers by the masking unit 66a of the masking member 66 is the same in manner as in the optical pickup 7 described above, so that detailed description is omitted.

In such a manner, the above-mentioned masking unit 66a of the masking member 66 shields the roughest bright and dark regions, where are mainly affecting the noise component, in the vicinities of the centers of the light receiving sections 54a, 54b, and 54c, so that the noise component can be minimized in requirement largely although not completely, as well as the optical power loss can be prevented.

In other words, the masking unit 66a of the masking member 66 improves the situation in that by shielding the entire return light portions to be incident in the light receiving sections 54a, 54b, and 54c from the other recording layers, the return light portion from the focus recording layer is also largely shielded so as to have the large optical power loss. Thereby, the degree of influence of the stray light becoming the noise component is reduced to the utmost as well as the optical power loss can also be reduced as small as possible.

In the optical pickup 60 configured as described above, upon emitting an optical beam from the light source 31, the optical beam is collimated by the collimator lens 37; it is divided into three beams by the diffraction grating 52; they are emitted toward the objective lens 33 by the beam splitter 35; and they are condensed by the objective lens 33 to form spots on the focus recording layer of the optical disc 2. The optical beams condensed on the recording layer are reflected to again enter the beam splitter 35, and their optical paths are changed by the beam splitter 35, so that the optical beams are condensed on the light receiving sections 54a, 54b, and 54c of the photo-detector 54, respectively, after passing through the masking member 66 and the condenser lens 38.

The optical pickup 60 according to the embodiment includes the light source 31, the diffraction grating 52, the objective lens 33, the photo-detector 54, the beam splitter 35, and the masking member 66. Since the masking unit 66a of the masking member 66 shields the central regions of the optical beams to be incident in the light receiving sections 54a, 54b, and 54c, respectively, among the optical beams reflected by the other recording layers or surfaces different from the recording layer for recording/reproducing information, the noise component and the loss in the optical power can be largely reduced.

In the optical disc apparatus 1 according to the embodiment, by providing the optical pickups 7, 50, and 60 described above, the central region of the optical beam incident in the light-receiving section among the optical beams reflected by the other recording layers or surfaces different from the recording layer for recording/reproducing information is shielded, so that the noise component and the loss in the optical power can be largely reduced. Furthermore, the optical disc apparatus 1 achieves preferable recording/reproducing characteristics in a multi-layered optical disc with a large recording capacity.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup for recording and/or reproducing information on/from an optical disc having one or a plurality of recording layers arranged in an incident direction of an optical beam, the optical pickup comprising:
   a light source emitting an optical beam with a predetermined wavelength;
   an objective lens for condensing an optical beam emitted from the light source on the recording layer of the optical disc;
   a photo-detector having a light-receiving section for receiving return light from the optical disc;
   an optical-path separating unit arranged between the light source and the objective lens for separating the optical path of the return light reflected by the optical disc from the optical path of the optical beam emitted from the light source; and
   a masking member arranged between the optical-path separating unit and the light-receiving section to have a masking unit shielding part of a passing-through optical beam or a diffracting unit diffracting part of a passing-through optical beam,
   wherein the masking unit or the diffracting unit of the masking member shields or diffracts the central region of the optical beam to be incident in the light-receiving section among the optical beams reflected by the other recording layers or surfaces different from the recording layer recording or reproducing information so as not to admit the central region to the light-receiving section, and
   wherein the spot-size ratio of the optical beam reflected by the recording layer for recording or reproducing information on the plane where the light receiving section is formed to the optical beams reflected by the other recording layers or surfaces on the plane where the light receiving section is formed is larger than the size ratio of the masking unit or the diffracting unit to the optical beam incident to the masking member.

2. The optical pickup according to claim 1, further comprising a diffraction element arranged between the light source and the objective lens for dividing an optical beam emitted from the light source into at least three optical beams,
   wherein the photo-detector includes a plurality of the light-receiving sections for respectively receiving the three optical beams, and the masking member is provided with one or a plurality of the masking units or the diffracting units for shielding or diffracting the central regions of the optical beams to be incident in the plurality of the light-receiving sections, respectively, among the optical beams reflected by the other recording layers or surfaces, so as not to admit the central regions to the plurality of the light-receiving sections, respectively.

3. An optical disc apparatus including an optical pickup for recording and/or reproducing information on/from an optical disc having one or a plurality of recording layers arranged in an incident direction of an optical beam and rotational driving means for rotating the optical disc, the optical disc apparatus comprising:
   a light source emitting an optical beam with a predetermined wavelength;
   an objective lens for condensing an optical beam emitted from the light source on the recording layer of the optical disc;
   a photo-detector having a light-receiving section for receiving return light from the optical disc;
   an optical-path separating unit arranged between the light source and the objective lens for separating the optical path of the return light reflected by the optical disc from the optical path of the optical beam emitted from the light source; and
   a masking member arranged between the optical-path separating unit and the light-receiving section to have a masking unit shielding part of a passing-through optical beam or a diffracting unit diffracting part of a passing-through optical beam,
   wherein the masking unit or the diffracting unit of the masking member shields or diffracts the central region of the optical beam to be incident in the light-receiving section among the optical beams reflected by the other recording layers or surfaces different from the recording layer recording or reproducing information so as not to admit the central region to the light-receiving section, and
   wherein the spot-size ratio of the optical beam reflected by the recording layer recording or reproducing information on the plane where the light receiving section is formed to the optical beams reflected by the other recording layers or surfaces on the plane where the light receiving section is formed is larger than the size ratio of the masking unit or the diffracting unit to the optical beam incident to the masking member.

4. An optical disc apparatus including an optical pickup for recording and/or reproducing information on/from an optical disc having one or a plurality of recording layers arranged in an incident direction of an optical beam and a rotational drive unit for rotating the optical disc, the optical disc apparatus comprising:
   a light source emitting an optical beam with a predetermined wavelength;
   an objective lens for condensing an optical beam emitted from the light source on the recording layer of the optical disc;
   a photo-detector having a light-receiving section for receiving return light from the optical disc;
   an optical-path separating unit arranged between the light source and the objective lens for separating the optical path of the return light reflected by the optical disc from the optical path of the optical beam emitted from the light source; and
   a masking member arranged between the optical-path separating unit and the light-receiving section to have a masking unit shielding part of a passing-through optical beam or a diffracting unit diffracting part of a passing-through optical beam,
   wherein the masking unit or the diffracting unit of the masking member shields or diffracts the central region of the optical beam to be incident in the light-receiving section among the optical beams reflected by the other recording layers or surfaces different from the recording layer recording or reproducing information so as not to admit the central region to the light-receiving section, and wherein the spot-size ratio of the optical beam reflected by the recording layer recording or reproducing information on the plane where the light receiving section is formed to the optical beams reflected by the other recording layers or surfaces on the plane where the light receiving section is formed is larger than the size ratio of the masking unit or the diffracting unit to the optical beam incident to the masking member.

* * * * *